United States Patent
King et al.

(10) Patent No.: US 9,184,934 B2
(45) Date of Patent: Nov. 10, 2015

(54) SYSTEMS AND METHODS FOR SHARING CONTROL DEVICES ON AN IO NETWORK

(75) Inventors: Dennis Brian King, Salem, VA (US); Andre DeMaurice, Salem, VA (US); Harry Ridenour, Salem, VA (US)

(73) Assignee: General Electric Company, Schenectady, NY (US)

(*) Notice: Subject to any disclaimer, the term of this patent is extended or adjusted under 35 U.S.C. 154(b) by 226 days.

(21) Appl. No.: 13/563,792

(22) Filed: Aug. 1, 2012

(65) Prior Publication Data
US 2013/0258860 A1 Oct. 3, 2013

Related U.S. Application Data

(60) Provisional application No. 61/618,220, filed on Mar. 30, 2012.

(51) Int. Cl.
*H04L 12/46* (2006.01)

(52) U.S. Cl.
CPC .................... *H04L 12/462* (2013.01)

(58) Field of Classification Search
CPC .......... H04L 61/2514; H04L 2463/101; H04L 29/12367; B60R 7/04; G06F 13/14; G06F 13/364; G06F 17/00; G06F 17/30386
See application file for complete search history.

(56) References Cited

U.S. PATENT DOCUMENTS

| | | | |
|---|---|---|---|
| 2007/0255832 A1* | 11/2007 | Riesberg et al. | 709/226 |
| 2011/0049884 A1* | 3/2011 | Rosenvard et al. | 290/44 |
| 2011/0082570 A1* | 4/2011 | Caffrey et al. | 700/90 |
| 2011/0232259 A1* | 9/2011 | Block et al. | 60/39.24 |
| 2012/0243518 A1* | 9/2012 | Lovmand | 370/338 |
| 2014/0081473 A1* | 3/2014 | Bengtson | 700/287 |

* cited by examiner

*Primary Examiner* — Jung Park
(74) *Attorney, Agent, or Firm* — Sutherland Asbill & Brennan LLP

(57) ABSTRACT

Certain embodiments of the invention can include systems and methods for enabling the operation of multiple control devices on the same network. Each control device on a network can be configured to monitor and receive input messages from multiple IO devices on the network. The control devices may also be configured to send output messages to one or more of the IO devices. According to certain embodiments, one control device may send output messages to certain IO devices while another IO device may send output messages to different IO devices. The input and output messages can both be sent via multicast according to certain embodiments.

14 Claims, 4 Drawing Sheets

SYSTEMS AND METHODS FOR SHARING CONTROL DEVICES ON AN IO NETWORK

RELATED APPLICATION

This application claims priority to U.S. Ser. No. 61/618,220, titled "Systems and Methods for Sharing Control Devices on an IO Network," filed on Mar. 30, 2012, the contents of which are incorporated herein by reference.

TECHNICAL FIELD

Embodiments herein relate generally to computer networking and more particularly to the operation of multiple controllers on the same input/output (IO) network.

BACKGROUND OF THE INVENTION

Existing computer networks may include a dedicated control device for performing various functions and communicating with various IO devices on the network. By virtue of the control devices being dedicated, they may require separate infrastructures or hardware each time a new control device may need to be added to a network to, for example, provide additional processing capability. The addition of control devices to a network, therefore, can be expensive. Additionally, sharing information among multiple control devices on separate networks can introduce latency, which can adversely affect the efficiency of network communications and in turn other systems or processes that depend thereon.

BRIEF DESCRIPTION OF THE INVENTION

Some or all of the above needs and/or problems may be addressed by certain embodiments of the invention. Certain embodiments may include systems and methods for enabling the operation of multiple control devices on the same network. According to one embodiment, there is disclosed a method including monitoring, by a control device on a network, for an input message from a plurality of input/output (IO) devices on the network. The method also includes receiving the input message at the control device, wherein the input message includes monitoring data for an asset. The method further includes sending, from the control device, an output message to at least one of the IO devices.

According to another embodiment, there is disclosed a system including a plurality of input/output (IO) devices on a network and a control device on the network. The control device includes at least one memory that stores computer-executable instructions and at least one processor configured to access the at least one memory. The at least one processor is configured to execute the computer-executable instructions to monitor for an input message from the plurality of IO devices, receive the input message, wherein the input message comprises monitoring data for an asset, and send an output message to at least one of the IO devices.

According to a further embodiment, there is disclosed one or more computer-readable media storing computer-executable instructions that, when executed by at least one processor, configure the at least one processor to perform operations. The operations include determining a unique Internet Protocol (IP) address for each of a plurality of control devices on a network, and associating the IP address for each of the plurality of control devices with a respective subset of input/output (IO) devices on the network. The association allows the plurality of control devices to send output messages to a respective subset of IO devices. Further, each of the plurality of control devices receives input messages from the plurality of IO devices, wherein the input messages comprise monitoring data for an asset.

BRIEF DESCRIPTION OF THE FIGURES

The detailed description is set forth with reference to the accompanying drawings, which are not necessarily drawn to scale. The use of the same reference numbers in different figures indicates similar or identical items.

DETAILED DESCRIPTION OF THE INVENTION

Figure 1:
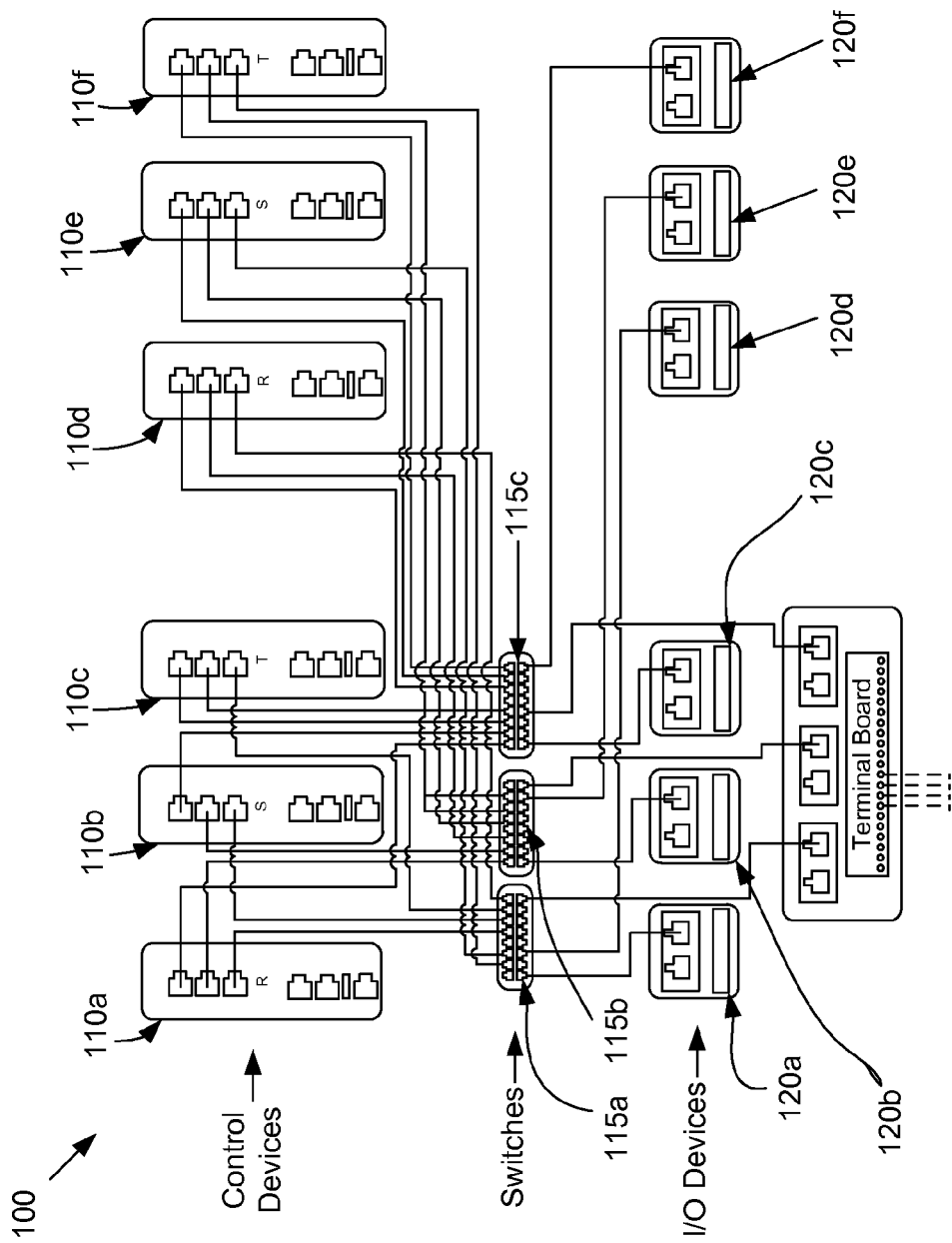
FIG. 1 depicts an example configuration of multiple controllers sharing the same network of IO devices, according to one embodiment of the invention.

Illustrative embodiments will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

Illustrative embodiments of the invention are directed to, among other things, the operation of multiple control devices on a single input/output (IO) network. As used herein, an IO network can refer to a computer network that connects control devices to various switches, IO devices, and other devices such that information can be shared between the devices on the network. For example, the control devices can communicate with the IO devices to receive input messages from the IO devices as well as send output messages to the control devices. In one example, the input messages can be data received from sensors associated with assets such as turbines or compressors. The control devices can receive such data and distribute them to other control devices or various other computing devices for modeling, analysis, and/or other processing or handling, for example. The control devices can also send output messages to IO devices for handling by the IO devices, assets, or other devices that may be connected to the IO network via the IO devices. Certain embodiments herein relate to enabling such communication to occur via multiple control devices on the same IO network. According to these embodiments, the control devices can each receive input messages from each of the IO devices while sending output to different ones of the IO devices. Such a configuration can prevent data collisions or other interference while leveraging the benefits of additional computing power realized from multiple control devices operating on the same IO network and improved operational efficiency of sending information through the IO network.

To facilitate collision-free and efficient communication via multiple control devices on an IO network, in one embodiment, each of the control devices can be configured to communicate with the IO devices. For example, one control device can be configured to send messages to a subset or certain IO devices, while another control device can be configured to send messages to another subset or a different IO device. According to one embodiment, such a configuration can be implemented by configuring each control device to have a unique Internet Protocol (IP) address not shared by the other control devices. IO devices can also be configured to monitor the IP address associated with a particular control device so that when the control device sends output messages to its associated IP address, IO devices monitoring that address can receive output messages from the control device. In some embodiments, the IO devices can receive output messages only from this control device. Additionally, the control devices can be configured to receive input messages from each of the IO devices such that each of the control devices can receive the same input messages on an IO network. According to certain embodiments, the input and output messages can be communicated via multicast. Multicast can be referred to as the delivery of a message or information to a group of devices simultaneously in a single transmission from a source device.

The technical effects of certain embodiments described herein can include, but are not limited to, reduced costs by way of fewer required switches, storage space, and other hardware associated with installing control devices on separate networks. Additionally, latency that may result from sending messages between networks may be reduced by adding control devices on a single IO network instead of on separate networks. Reduced latency can lead to more efficient and reliable communications throughout the network, as well as simpler network designs. Generally, costs and efforts associated with creating new network infrastructures can be reduced in a way that control devices can be added to IO networks that may already include the required network infrastructure.

FIG. 1 depicts an example IO network 100 that includes, but is not limited to, multiple control devices, switches, and IO devices, according to one embodiment of the invention. As indicated in FIG. 1, the example IO network 100 can include control devices 110a-f, switches 115a-c, and IO devices 120a-f. As described herein, a control device can manage devices on an IO network, receive inputs, and deliver outputs via multiple networks, e.g., Ethernet networks. Control devices may share processing on an IO network. For example, control devices 110d, 110e, and 110f can be added to the IO network 100 to perform algorithms previously performed by control devices 110a, 110b, and 110c to, for example, increase the processing capability or efficiency of devices on the IO network 100. Control devices may be generally referred to as controllers or control sets.

The IO devices 120a-f can be used to terminate network connections, e.g., Ethernet network connections, in the IO network 100. An IO device can include a processor board and a data acquisition board for receiving different types of data signals, e.g., analog or digital. An IO device may also be referred to as an IO pack.

The switches 115a-c can be used to route messages between the control devices 110a-f and the IO devices 120a-f. As shown in FIG. 1, three switches can be used to switch communications for six control devices in communication with six IO devices on the IO network 100. Thus, according to the example embodiment in FIG. 1, the ratio of control devices to switches can be greater than 1:1 to allow multiple control devices to operate on the IO network 100 without adding additional switches for each additional control device. Network ports on the control devices 110a-f and IO devices 120a-f can be connected to ports on the switches 115a-c.

As used herein, the term "device," e.g., as used in control device and IO device, can refer to any component that includes one or more suitable processors that can be configured to execute computer-readable, computer-implemented, or computer-executable instructions. A switch as used herein can also be a device as described above. Examples of other devices described herein can include, but are not limited to, a personal computer, mainframe, web server, mobile device, or any computing device or processor-based device capable of executing instructions to perform the functions described in embodiments herein.

As used herein, the terms "output" and "input" are used for illustration purposes only and are not meant to restrict or limit the type of messages that can be received at a device or sent from a device in the network. In some embodiments, an input message can be an output message, and vice versa, depending on the perspective. For example, in embodiments herein, the term "output" is used generally to refer to messages sent from a control device, while "input" is used generally to refer to messages that are received by the control device. The terms can be reversed, however, in embodiments that describe the flow of messages from the perspective of an IO device.

The lines connecting the control devices 110a-f, the switches 115a-c, and the IO devices 120a-f shown in FIG. 1 can indicate communication connections between the devices. Thus, as indicated, the control devices 110a-f can communicate with the IO devices 120a-f in the IO network 100. For example, control device 110a can be configured to send output messages to IO devices 120a and 120b, control device 110b can be configured to send output messages to IO devices 120c and 120d, and control device 110d can be configured to send output messages to IO devices 120e and 120f. According to this example configuration, the control devices may be configured to send output messages only to the devices to which they are configured to send output messages. Thus, according to the above example, control device 110b may not send output messages to IO devices 120a, 120b, 120e, or 120f. Also according to the example configuration, control devices 110a-f can be configured to receive input messages from each of the IO devices 120a-f. For example, control devices 110a and 110d can receive the same input messages from IO devices 120a-f.

The above example configuration describes only one non-limiting example illustrating communication between the devices in the IO network 100. Many other examples and/or combinations of devices may exist in other embodiments. For example, each control device 120a-f may send output messages to one or more of the IO devices 120a-f. Also, although six control devices, three switches, and six IO devices are shown, fewer or more of these devices may exist in other embodiments.

In addition to communicating with each other, the control devices 110a-f and the IO devices 120a-f can also communicate with various other devices. For example, the control devices 110a-f can send input messages received from the IO devices 120a-f to one or more computing devices (not shown) for modeling, analysis, and/or other processing or handling. The control devices 110a-f can also receive data from sensors associated with assets (not shown). Examples of assets include, but are not limited to, turbines and compressors.

Figure 2:
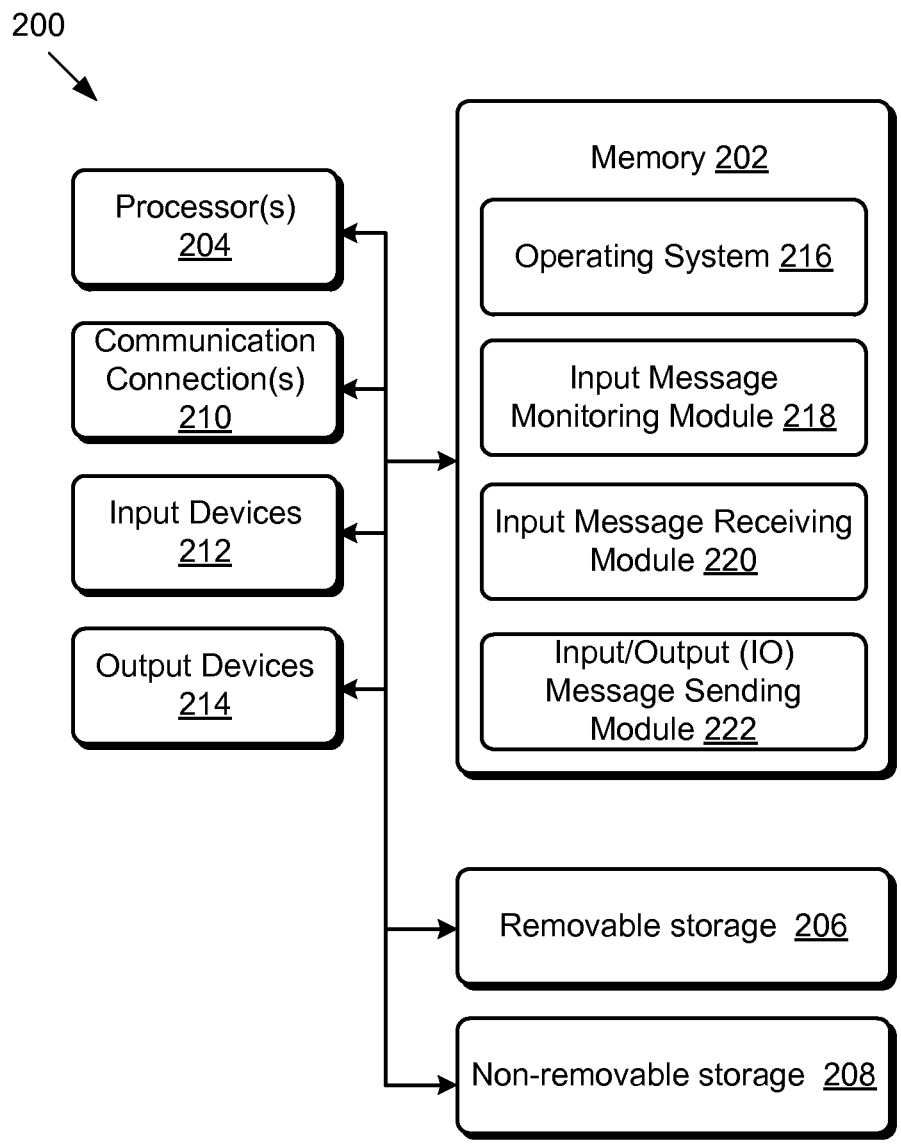
FIG. 2 is a block diagram of an example computing environment for enabling communication between multiple control devices and multiple IO devices on the same network, according to one embodiment of the invention.

FIG. 2 depicts a block diagram of an example computing environment 200 for enabling communication via multiple control devices and multiple IO devices on the same IO network, according to one embodiment of the invention. The computing environment 200 can include one or more devices, e.g., control devices 110*a-f*, which can include a processor 204 capable of communicating with a memory 202. The processor 204 may be implemented as appropriate in hardware, software, firmware, or combinations thereof. Software or firmware implementations of the processor 204 may include computer-executable or machine-executable instructions written in any suitable programming language to perform the various functions described.

A memory 202 can store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). In some embodiments, the devices may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing environment 200 may also contain one or more communication connections 210 that allow the devices to communicate with devices or equipment capable of communicating with a computing device. The connections can be established via various data communication channels or ports, such as USB or COM ports, to receive connections for cables connecting the devices, e.g., control devices, to various other devices in an IO network. Devices in the IO network 100, e.g., control devices, can include communication drivers such as Ethernet drivers that enable the devices to communicate with other devices on the IO network. According to various embodiments, the one or more communication connections 210 may be established via a wired and/or wireless connection on the IO network. The computing environment 200 may also include one or more input devices 212, such as a keyboard, mouse, pen, voice input device, and touch input device. It may also include one or more output devices 214, such as a display, printer, and speakers.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

Turning to the contents of the memory 202, the memory 202 can include, but is not limited to, an operating system (OS) 216 and one or more application programs or services for implementing the features and aspects disclosed herein. Such applications or services can include an input message monitoring module 218, an input message receiving module 220, and an IO message sending module 222. In one embodiment, the modules 218, 220, and 222 can be implemented by a software that is provided in configurable control block language and is stored in non-volatile memory.

In one embodiment, the OS 216 can include a QNX® real-time, multitasking operating system. The input message monitoring module 218 can monitor multiple IO devices for an input message on a network. In one embodiment, each of the IO devices on a network can be monitored by a control device executing program code for the input message monitoring module 218. Each control device on the network can also be configured to monitor input messages from the same, fewer, or more of the IO devices on the network such that each control device can receive input messages from each of the IO devices. In addition to IO devices, the input message monitoring module 218 may also monitor messages from other devices, such as control devices or other computing devices.

Certain embodiments herein relate to communication between devices that may or may not be configured for safety integrity level (SIL). As used herein, SIL can relate to a target level of risk reduction associated with the performance of devices in the IO network. In one embodiment, both SIL and non-SIL IO devices can be monitored by the control devices. For example, control devices that may not be configured for SIL can receive input messages from IO devices that may be configured for or not configured for SIL.

The input message receiving module 220 can receive input messages from the IO devices. In one embodiment, a control device executing the input message receiving module 220 can receive the input messages that were being monitored by the input message monitoring module 218 at the control device. The input message can include various data, text, signals, or other information that may be encoded for proper transmission on the IO network, e.g., via TCP/IP or UDP/IP protocol. The input messages can be received at various predetermined rates, including every 10-, 20-, or 30-milliseconds. IO devices can be configured to send input messages at the predetermined rates such that all messages can be sent to the control devices simultaneously. The input messages can include various types of information. In one example, the information can include monitoring data for an asset. In one aspect of this example, the monitoring data can be received from a sensor associated with the asset, such as a turbine or a compressor. The input message can be received via multicast according to certain embodiments herein.

The IO message sending module 222 can send an output message from a control device, or other device executing the IO message sending module 222, to IO devices. The IO message sending module 222 can enable control devices to send output messages to a subset or only certain ones of the IO devices in a network. For example, one control device can send output messages to one subset of IO devices while another control device can send output messages, e.g., the same output messages, to another subset of IO devices. In this way, all of the IO devices can receive output messages, albeit from different control devices in the above example. According to one embodiment, the IO devices can receive output messages only from a particular control device, e.g., the control device to which it has been configured to listen. Additionally, the IO message sending module 222 can send output messages to other control devices or computing devices. In one embodiment, the input messages received from the IO devices can be sent from a control device, e.g., as output messages, to such other control devices or computing devices. In one embodiment, output messages can be sent via multicast and can include, but are not limited to, various data, text, signals, or other information that may be encoded for proper transmission on the IO network, e.g., via TCP/IP protocol.

Figure 3:
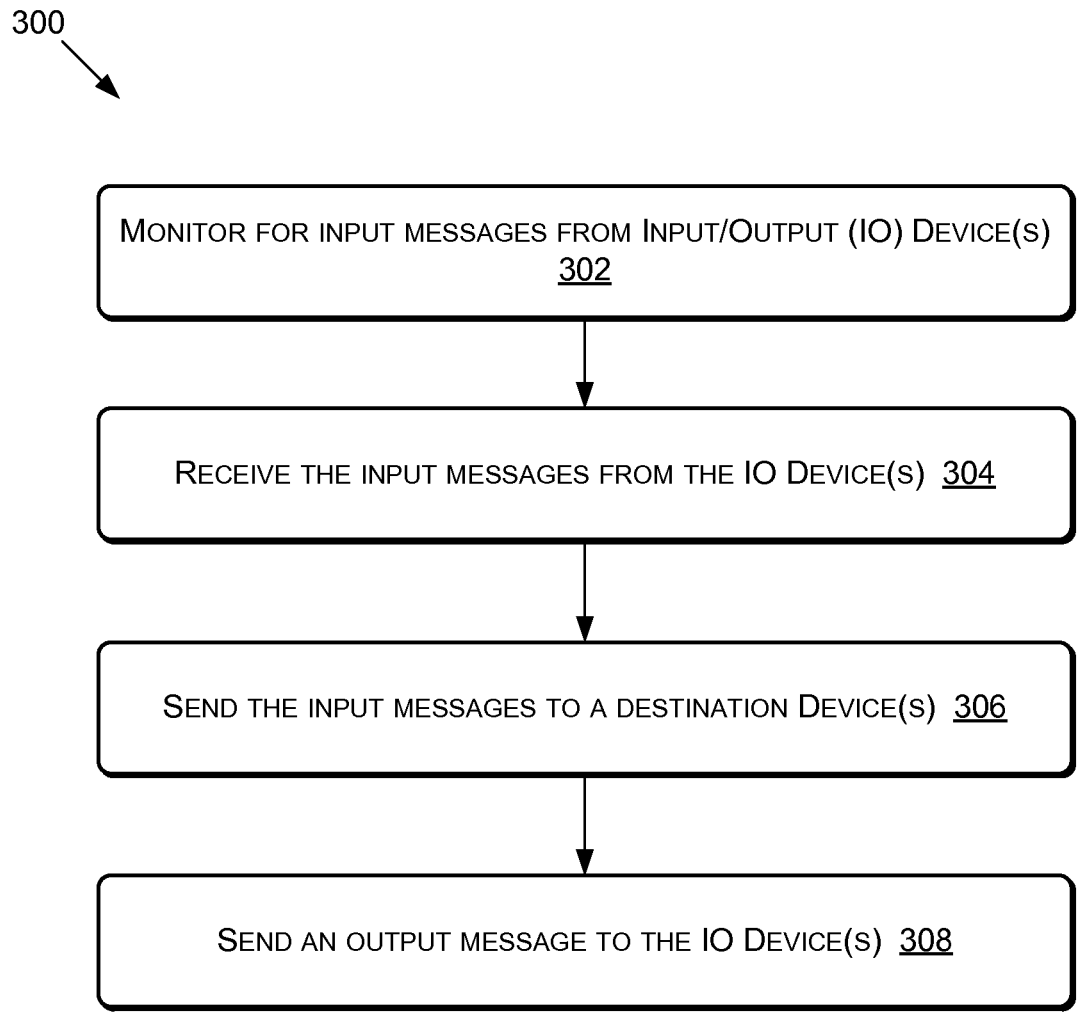
FIG. 3 is a flow diagram illustrating details of an example method for receiving input messages from and sending messages to IO devices on the same network as multiple control devices, according to one embodiment of the invention.

FIG. 3 depicts an example flow diagram 300 illustrating details of a method for multiple control devices communicating with IO devices on an IO network, according to one embodiment of the invention. In one example, a control device can perform any, some, or all of the operations of the method 300. In this particular implementation, input messages from IO devices can be monitored at block 302. In one embodiment, such monitoring can be performed by the input message monitoring module 218. As noted, control devices can monitor input messages sent from each of the IO devices on an IO network. The input messages can be received, e.g., by the input message receiving module 220, at block 304. The input messages can be received by each control device on a network, according to one embodiment, such that all control devices receive the same input messages from the IO devices on the network. In one embodiment, the input messages can be received simultaneously based in part on their being sent via multicast. The input messages can be sent to a destination device, e.g., another control device or other computing device, at block 306.

At block 308, an output message can be sent to IO devices in the IO network. In one embodiment, the IO message sending module 222 associated with a control device can enable the control device to send an output message to certain predetermined IO devices. A determination of the predetermined IO devices will be discussed in association with FIG. 4. As noted, each control device on an IO network can send an output message to different ones of the IO devices, in one embodiment.

Figure 4:
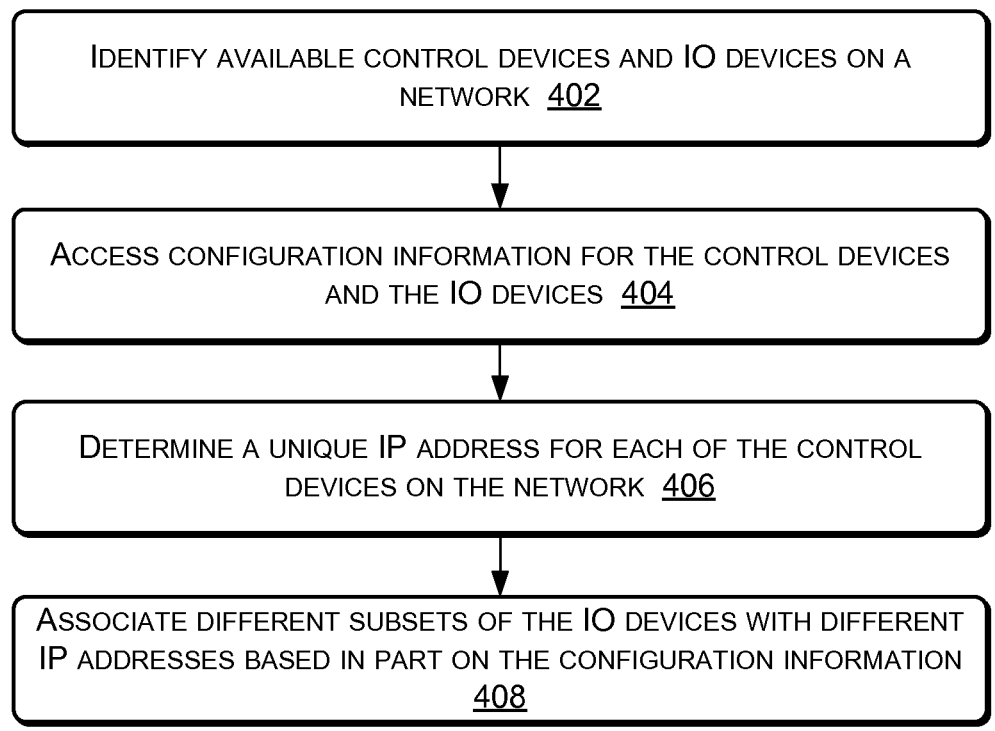
FIG. 4 is a flow diagram illustrating details of an example method for configuring a network such that multiple control devices can communicate with multiple IO devices without collisions or conflicts, according to one embodiment of the invention.

FIG. 4 depicts a flow diagram of an example method 400 for configuring an IO network for multiple control devices operating on the network. At block 402, available control devices and IO devices on an IO network can be identified. In one embodiment, a computing device can be connected to the IO network to determine which devices are connected to the network. The computing device can execute a software application, such as Toolbox ST®, to make such a determination and perform various configurations of the devices described in association with the example method 400.

At block 404, configuration information for the devices on the IO network can be accessed. In one embodiment, the configuration information can be used to determine which devices to associate with one another for communication on the IO network. For example, in some embodiments, control devices that are not configured for SIL may not send output messages to IO devices that are configured for SIL. Similarly, control devices that are configured for SIL may not send output messages to IO devices that are not configured for SIL. SIL status, therefore, can be accessed to facilitate the association between devices on the network. In other embodiments, devices may communicate with one another independent of their SIL status. Various other configuration information or criteria can be used in other embodiments to associate devices on the IO network.

At block 406, a unique IP address for each control device on the network can be determined. IO devices on the network can be associated with the IP address, at block 408. According to this configuration, output messages sent from the control device, e.g., via multicast, to the determined IP address can be received by IO devices by virtue of the IO devices monitoring the IP addresses. In this fashion, one or more IO devices can be configured to communicate with different IP addresses determined for each control device. As noted above, configuring IO devices to receive output messages from different control devices, e.g., and only those control devices according to certain embodiments, can prevent data collisions on the network. Additionally and/or alternatively, the IO devices can be configured to send, e.g., via multicast, their input messages to a certain IP address to which all control devices can monitor. In this way, each control device can receive the same input messages from the IO devices on the network.

The methods 300 and 400 are illustrated as logical flow diagrams, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include control blocks, routines, programs, objects, components, data structures, and the like that perform particular functions or implement particular abstract data types. The order in which the operations are described is not intended to be construed as a limitation, and any number of the described operations can be combined in any order and/or in parallel to implement the process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
   associating, by a control device on a network, a unique Internet Protocol (IP) address of the control device with a subset comprising at least two of a plurality of input/output (I/O) devices on the network, wherein the associating comprises identifying the I/O devices in the subset based at least in part on whether the I/O devices in the subset are configured for a safety integrity level;
   monitoring, by the control device, for an input message from the plurality of I/O devices;
   receiving, by the control device, the input message from at least one of the plurality of I/O devices, wherein the at least one of the plurality of I/O devices is not one of the subset of I/O devices, and wherein the input message comprises monitoring data for an asset;
   sending, by the control device, an output message to the subset of I/O devices using the unique IP address of the control device, wherein the subset of I/O devices is configured to listen from the control device based on the unique IP address; and
   wherein the input message is received via multicast and the output message is sent via multicast.

2. The method of claim 1, wherein the control device comprises a first control device and the subset of I/O devices comprises a first subset, and wherein the method further comprises:
   monitoring, by a second control device on the network, for the input message;
   receiving, by the second control device, the input message; and sending, by the second control device, an output message to a second subset comprising at least two other devices of the plurality of I/O devices on the network.

3. The method of claim 1, wherein the control device is configured to receive the input message from each of the plurality of I/O devices, wherein the plurality of I/O devices comprise devices configured for the safety integrity level and devices configured for a non-safety integrity level.

4. The method of claim 1, wherein the control device sends the output message only to the subset of I/O devices.

5. The method of claim 1, wherein the monitoring data is received from a sensor associated with the asset, wherein the asset comprises at least one of a turbine or a compressor.

6. The method of claim 1, wherein the subset of I/O devices comprises only devices that are each configured for the safety integrity level.

7. A system comprising:
a plurality of input/output (I/O) devices on a network;
a control device on the network, wherein the control device comprises at least one memory that stores computer-executable instructions and at least one processor configured to access the at least one memory, wherein the at least one processor is configured to execute the computer-executable instructions to:
associate a unique Internet Protocol (IP) address of the control device with a subset comprising at least two of the plurality of I/O devices on the network, wherein the associating comprises identifying the I/O devices in the subset based at least in part on whether the I/O devices in the subset are configured for the safety integrity level;
monitor for an input message from the plurality of I/O devices;
receive the input message from at least one of the plurality of I/O devices, wherein the at least one of the plurality of I/O devices is not one of the subset of I/O devices, and wherein the input message comprises monitoring data for an asset;
send an output message to the subset of I/O devices using the unique IP address of the control device, wherein the subset of I/O devices is configured to listen from the control device based on the unique IP address; and
wherein the input message is received via multicast and the output message is sent via multicast.

8. The system of claim 7, wherein the subset comprises a first subset and the control device comprises a first control device, the system further comprising a second control device on the network, wherein the second control device comprises at least one memory that stores computer-executable instructions and at least one processor configured to access the at least one memory, wherein the at least one processor is configured to execute the computer-executable instructions to:
monitor for the input message from the plurality of I/O devices;
receive the input message; and
send an output message to a second subset comprising at least two other devices of the plurality of I/O devices.

9. The system of claim 7, wherein the control device is configured to receive the input message from each of the plurality of I/O devices, wherein the plurality of I/O devices comprise devices configured for the safety integrity level and devices configured for a non-safety integrity level.

10. The system of claim 7, wherein the control device sends the output message only to the subset of I/O devices.

11. The system of claim 7, wherein the monitoring data is collected via a sensor associated with the asset, wherein the asset comprises at least one of a turbine or a compressor.

12. One or more non-transitory computer-readable media storing computer-executable instructions that, when executed by at least one processor, configure the at least one processor to perform operations comprising:
determining a unique Internet Protocol (IP) address for each of a plurality of control devices on a network; and
associating the unique IP address for each of the plurality of control devices with a respective subset comprising at least two of a plurality of input/output (I/O) devices on the network, wherein the associating comprises identifying the I/O devices in the respective subset based at least in part on whether the I/O devices in the respective subset are configured for a safety integrity level;
wherein the associating allows the plurality of control devices to send an output message to their associated unique IP address for receipt by the respective subset of I/O devices, wherein the respective subset of I/O devices is configured to listen from their respective control devices based on the unique IP address of the respective control device;
wherein each of the plurality of control devices receives input messages from the plurality of I/O devices, wherein the at least one of the plurality of I/O devices is not one of the subset of I/O devices, and wherein the input messages comprise monitoring data for an asset; and
wherein the input messages are received via multicast and the output messages are sent via multicast.

13. The one or more non-transitory computer-readable media of claim 12, wherein the monitoring data is collected via a sensor associated with the asset, wherein the asset comprises at least one of a turbine or a compressor.

14. The one or more non-transitory computer-readable media of claim 12, wherein the plurality of control devices sends the output messages only to a respective subset of I/O devices.

* * * * *